April 27, 1954   M. N. SALAZAR   2,676,772
LANDING FLAP
Filed Dec. 29, 1952   2 Sheets-Sheet 1

Miguel N. Salazar
INVENTOR.

BY Clarence A. O'Brien
and Harvey B. Jacobson
Attorneys

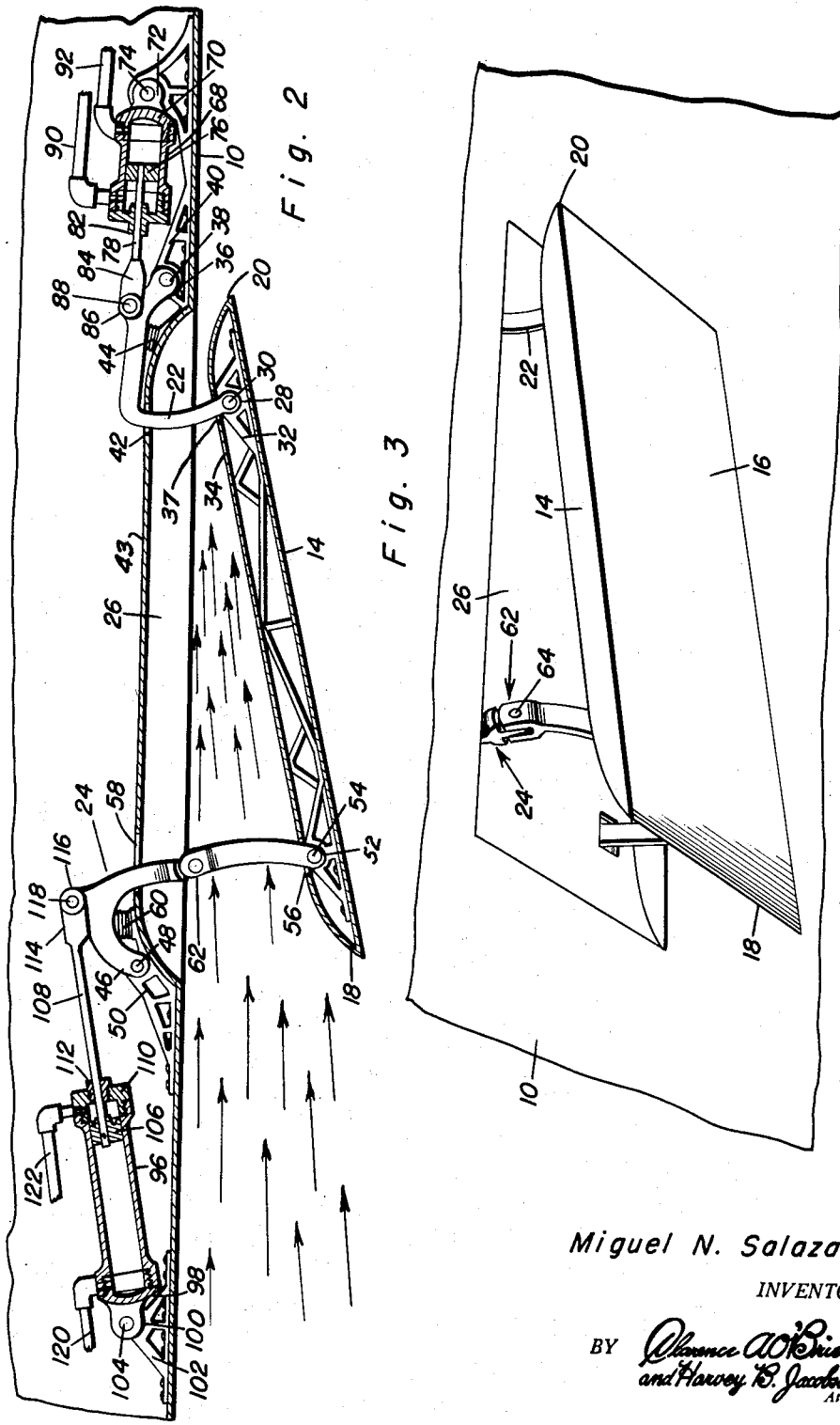

Patented Apr. 27, 1954

2,676,772

UNITED STATES PATENT OFFICE 2,676,772

LANDING FLAP

Miguel N. Salazar, Oklahoma City, Okla.

Application December 29, 1952, Serial No. 328,428

2 Claims. (Cl. 244—113)

This invention relates to landing flaps and particularly air engaging brake means for rapidly reducing the speed of aircrafts on landing.

In the landing of aircrafts on short runways or on the deck of aircraft carriers it is desirable to reduce the speed of the craft in the shortest possible time so that the craft may be successfully landed on relatively short runways. It has heretofore been proposed to utilize various types of impedances such as elastic means to be engaged by the craft as well as by the use of friction means to retard the speed thereof. These devices have been unsatisfactory particularly as they cannot be controlled from within the aircraft itself.

The present invention provides air flaps which can be projected into the air currents adjacent to the aircraft and set up turbulence in the air to produce the maximum drag on the craft and thus rapidly decrease its speed of motion.

This is accomplished by means of air flaps which are projected in spaced relation to the side of the aircraft when in braking operation or retracted into recesses so that they are flush with the outer surface of the aircraft during normal operation thereto. The air flaps operate as air scoops with a reduced outlet area to produce the maximum turbulence and drag in the air which it intercepts. The flap is further operated in such manner that it will close with the minimum of disturbance and likewise open in the same manner so that the minimum of stress will be applied to the aircraft on the opening and closing of the flaps.

It is accordingly an object of the invention to provide an improved aircraft brake.

It is a further object of the invention to provide air flaps which may be readily projected from inside the aircraft.

It is a further object of the invention to provide aircraft flaps which may be opened and closed with a minimum of shock to the aircraft.

Other objects and many of the attendant advantages of the invention will be apparent from the following detailed description taken in conjunction with the accompanying drawing in which:

Figure 2 is a sectional elevational through a single air flap and showing the actuating structure therefor;

Figure 3 is an enlarged perspective view of a single air flap in open position.

Figure 1:
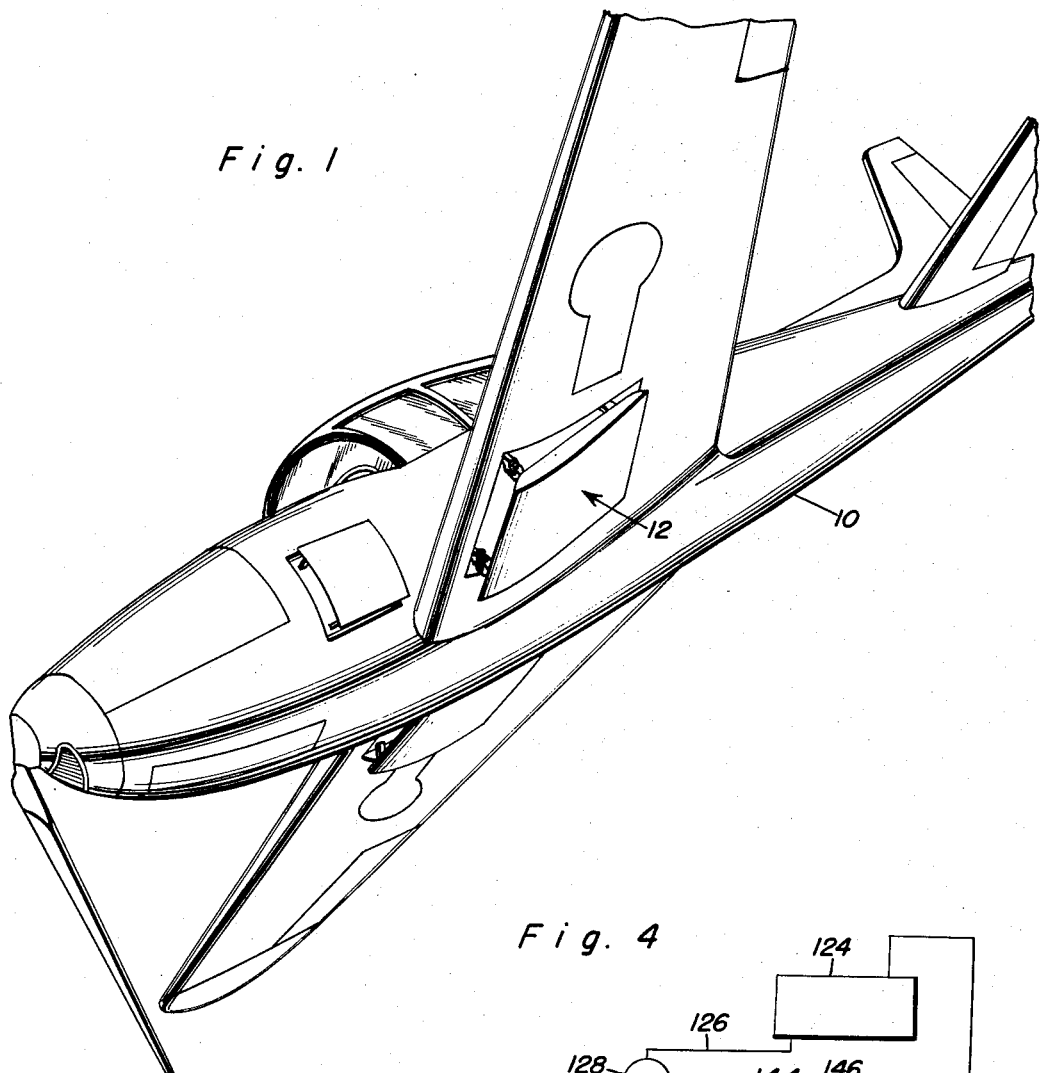
Figure 1 is a perspective view of an aircraft showing a plurality of the brake devices applied.

In the exemplary embodiment of the invention an aircraft 10 is herein shown as of the relatively slow propeller driven type but obviously could be either jet or rocket propelled. A plurality of brakes 12 are mounted on various portions of the craft 10 for reducing the velocity of the aircraft when the brakes 12 are in place.

Each of the brakes 12 consists of an externally mounted air flap 14 having an outer surface 16 adapted to conform with the surface of the craft to which the flap 14 is applied. The flaps 14 being supplied with a relatively sharp leading edge 18 and a streamline rear edge 20. Each of the flaps 14 will be supported by means of a plurality of rear supporting arms 22 and a plurality articulated front supporting arms 24. The craft 10 will be supplied with recesses 26 to receive the flaps 14 so that the outer surface 16 thereof will lie substantially flush with the outer surface of the craft when the flaps are in retracted position. The rear arms 22 will be of the bell crank or angulated type having one end 28 mounted on a pivot pin 30 fixed in the reinforcing framework 32 of the flap 14 and the inner cover 34 of the flap 14 will be provided with an elongated slot 37 so that the arm 22 may swing about the pivot pin 30 to allow angular motion of the flap 14 about the arm 22. The inner end 36 of the arm 22 is mounted by a pin 38 on a mounting structure 40 within the craft 10, the arm 22 extending through a slot 42 in the skin at the bottom of the depression 26. A shock absorbing spring 44 is mounted between the inner surface of the inner skin 43 of the craft 10 and the angulated arm 22.

The front angulated arm 24 of the bell crank comprises a front end 46 mounted by a pin 48 to a frame structure 50 within the skin of the craft 10. An outer end 52 is mounted by a pin 54 to the framework 32 of the flap 14 and extends through a slot 56 in the inner skin 34 thereof. Likewise the arm 24 extends through a slot 58 and the inner skin 43 of the craft 10. The shock absorbing spring 60 is mounted on the mounting structure 50 and is interposed between the structure 50 and the articulated arm 24. The arm 24 is provided with a knuckle articulation 62 having a pivot pin 64 so that the arm 24 may move as may be desired during the shifting of the flap 14. The arms 22 and 24 are so proportioned that when the flap 14 is fully extended the space 63 between the rear edge 20 of the flap 14 and the skin of the vehicle 10 will be approximately one-third of the distance or space 66 between the leading end 18 of the flap 14 and the skin of the craft 10.

The actuating means for the rear arm 22 comprises a double-acting cylinder 68 having a rear end 70 fastened therein and having a knuckle end 72 pivotally mounted on a portion of the supporting structure by means of a pintle pin 74. A piston 76 is slidable in the cylinder 68 and a piston rod 78 extends through the end 80 of the cylinder 68 and is provided with a suitable packing gland 82. The knuckle end 84 on the piston rod 78 is connected to a knuckle joint 86 on the angulated arm 22 by means of a pintle pin 88. A fluid conduit 90 is connected to the forward end of the cylinder 68 and a fluid conduit 92 is connected to the rear end of the cylinder to provide both inlet and exit at both ends of the cylinder.

A control system for the forward articulated arm 24 comprises a double-acting cylinder 96 having a forward end 98 provided with a knuckle end 100 secured to a supporting mechanism 102 mounted in the vehicle 10 by means of a pintle pin 104. A piston 106 is slidable in the cylinder 96 and is provided with a piston rod 108 extending through the rear end 110 of the cylinder 96 and being provided with a packing gland 112. The piston rod 108 is provided with a knuckle end 114 which is connected to an intermediate point 116 of the arm 24 by means of a pintle pin 118. The fluid end of a conduit 120 is connected to the forward end of the cylinder 96 and a fluid conduit 122 is connected to the rear end of the cylinder 96.

The operating system for this piston 68 and 96 comprises a reservoir 124 from which a conduit 126 delivers fluid to a pump 128. A control valve 130 is provided with a barrel 132 having a port 134 connected to the pump 128 by means of a conduit 136. An opposed port 140 in the barrel 132 is connected to the reservoir 134 by means of a conduit 142. A by-pass valve 144 is provided between the conduits 136 and 142 and is connected thereto by means of a conduit 146. A port 148 in the barrel 132 is connected to a conduit 150 which connects to a first interlock valve 152 and the final port 154 in the barrel 132 is connected to a second interlock valve 156. The valve 130 is provided with a valve cylinder 158 having a pair of ports 160 and 162 therein. A handle 164 is applied to the cylinder 158 so that the conduits 162 and 160 may be connected at the will of the operator to apply the pump to either the conduit 150 or the conduit 166, extending between the port 154 and the valve 156.

The sequence control valve 152 is provided with a barrel 170 having a port 172 therein to which is connected a conduit 150. An outlet port 174 is connected to conduit 92 which connects to the rear end of the piston 68. The third port 176 connects to conduit 120 which connects to the forward end of piston 96. The barrel 170 is provided with a valve body 178 which is controlled by a handle 180 which is biased by means of a spring 182 so that in normal operation the valve body 178 will keep the port 176 closed. An actuating means herein shown as solenoid 184 is controlled by means of a limit switch 186 which is in turn controlled by a stop member 188 on the angulated support 22.

The sequence control valve 156 is provided with the valve barrel 190 having a port 192 to which the conduit 166 connects. An outlet port 194 is connected to the conduit 90 and to the forward end of the cylinder 68. Outlet port 196 is connected to the conduit 122 which connects in turn to the rear end of the cylinder 96. The valve element 198 is mounted in the barrel 190 and controlled by means of a control lever 200 which is normally biased by means of the spring 202 to move the body 198 to close the port 194. Actuating solenoid 204 is controlled by means of a limit switch 206 which is actuated by means of a limit stop 208 on the articulated arm 24.

Figure 4:
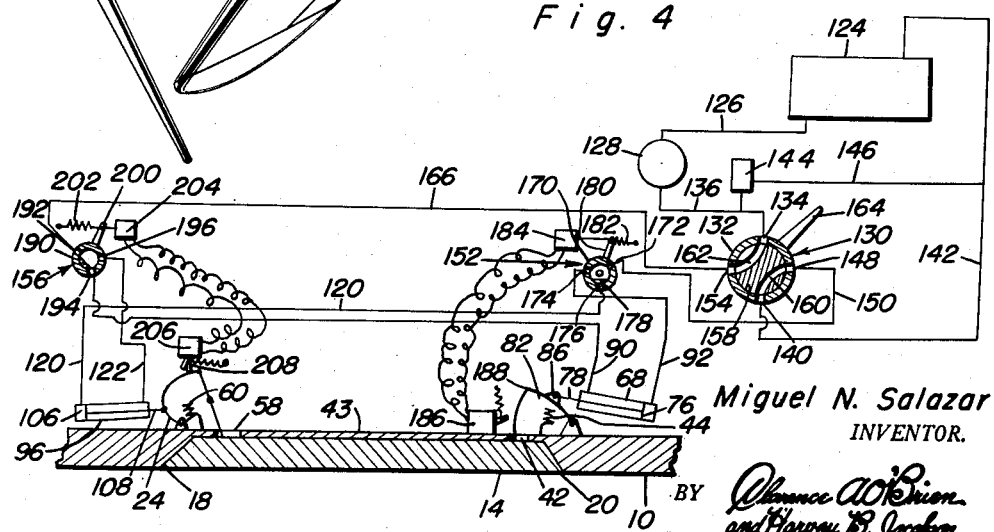
Figure 4 is a schematic control diagram showing the control system for opening and closing the air flap.

In the operation of the device according to the invention the pump 128 will be operated to provide pressure which will normally be by-passed by means of by-pass valve 144 but when it is desired to operate the flaps 14 in either direction the handle 164 will be manually controlled and as shown in Figure 4 the handle 164 has been manipulated to bring the conduit 162 to connect the ports 134 and 154 so that fluid flows through the conduit 166 to the valve 156. During the initial operation according to this position the spring 202 will have moved the valve 198 to close the port 194 so that fluid will flow through the conduit 122 into the rear end of the cylinder 96 so that the piston 106 withdraws the piston rod 108 so that the bell crank arm 24 moves about the pivot pin 48 to bring the leading edge 18 of the flap 14 into closed position. At this moment the stop 208 will actuate the switch 206 to energize the solenoid 204 to move the handle 200 to open the port 194 so as fluid flows through the conduit 90 to the forward end of the cylinder 68 so that the piston 76 is withdrawn so that piston rod 78 moves bell crank arm 22 interiorly of the structure to close the flap 14.

To open the flap the handle 164 is moved to such position that the passage 160 will connect the pump 128 to the outlet port 128 so that conduit 150 would apply pressure through the port 172 of the valve 152. Since the bell crank 22 is in inward position the stop 188 will be released from the switch 186 and the solenoid 184 will be deenergized so that the spring 182 will have closed the port 176 leading to the conduit 120. The port 174 will then allow fluid to flow through the conduit 92 to the forward end of the piston 68. The admission of fluid to the rear end of cylinder 68 will push the piston 76 forward so that the bell crank 22 will move about the pivot pin 38 so that the rear end 20 of the flap 14 is pushed outwardly. When the bell crank 22 is moved through its full motion the stop 188 will actuate the switch 186 so that the solenoid 184 will move the handle 180 to uncover the port 176 so that fluid will flow through the passage 120 to the forward end of cylinder 96 so that piston 106 will move backward in the cylinder 96 and move bell crank 22 through an arcuate motion to project the forward edge 18 of the flap 14 into the air stream alongside of the craft 10. The movement of the bell crank 24 to extended position will release the lock 208 from the switch 206 so that the spring 202 will bring the valve 196 to covering position with the port 194.

It will thus be seen that the control system is operative so that in opening position the rearmost part of the flap 14 is moved to open position after which the forward edge of the flap is moved to open position so that the air stream will be gradually applied to the flap 14 so that the shock springs 44 and 60 take the shock when the complete air force of the air stream is applied to the flap 14 so that the shock will be substantially reduced on the body of the craft 10. Likewise, on the closing action the forward edge of the flap 14 will be seated against the body of the craft 10 to relieve the air stress thereunder before the rear end of the flap 14 is moved to closed position.

It will further be seen that by providing brake flaps which extend diagonally with respect to and spaced from the side of the body of the vehicle they provide air scoops which entrain the maximum amount of air and produce the maximum amount of drag to rapidly reduce the speed of the craft after the flaps have been extended.

While for purpose of exemplification a preferred embodiment of the invention has been shown and described according to the best present understanding thereof, it will be apparent to those skilled in the art that many changes may be made in the construction and arrangement of the parts thereof without departing from the true spirit and purpose of the invention.

What is described as new is as follows:

1. An aircraft brake comprising a flap, said craft having a recess for receiving said flap, angulated support arms for the front and back of said flap, said front and back arms being so arranged that said flap when extended is supported in angular relation to said craft, whereby the space between the rear edge of the flap and the surface of the craft is of the order of one-third the space between the front edge of the flap and the surface of the craft, said arms being pivotally connected to said craft and to said flap, actuating means for said front and back arms including double-acting fluid cylinders connected between said craft and an intermediate portion of said arms, a main fluid valve determining the direction of operation of said cylinders, interlock valves determining the sequence of operation of said cylinder.

2. An aircraft brake comprising a flap, said craft having a recess for receiving said flap, angulated support arms for the front and back of said flap, said front and back arms being so arranged that said flap when extended is supported in angular relation to said craft, whereby the space between the rear edge of the flap and the surface of the craft is of the order of one-third the space between the front edge of the flap and the surface of the craft, said arms being pivotally connected to said craft and to said flap, actuating means for said front and back arms including double-acting fluid cylinders connected between said craft and an intermediate portion of said arms, a source of operating fluid, a control valve for applying said operating fluid to said cylinders, interlock valves controlling the sequence of operation of said cylinders, one of said interlock valves being operative on opening motion of said cylinders to admit fluid to the forward edge control cylinder only in response to opening of the rear edge of said flap, another of said interlock valves being operative on closing motion of said cylinders to admit fluid to the rear edge control cylinder only in response to closing of the forward edge of said flap.

References Cited in the file of this patent

UNITED STATES PATENTS

| Number | Name | Date |
|---|---|---|
| 1,731,735 | Aten | Oct. 15, 1929 |
| 2,354,116 | Hajek | July 18, 1944 |
| 2,461,967 | Devlin | Feb. 15, 1949 |

FOREIGN PATENTS

| Number | Country | Date |
|---|---|---|
| 524,280 | Great Britain | Aug. 2, 1940 |